Jan. 20, 1959   J. E. TUSCHER   2,869,528
FUEL FEED DEVICE FOR INTERNAL COMBUSTION ENGINES
Filed April 1, 1955   6 Sheets-Sheet 1

INVENTOR
JEAN EDOUARD TUSCHER

BY
Wenderoth, Lind & Ponack
Attys.

Jan. 20, 1959   J. E. TUSCHER   2,869,528
FUEL FEED DEVICE FOR INTERNAL COMBUSTION ENGINES
Filed April 1, 1955   6 Sheets-Sheet 2

INVENTOR
JEAN EDOUARD TUSCHER

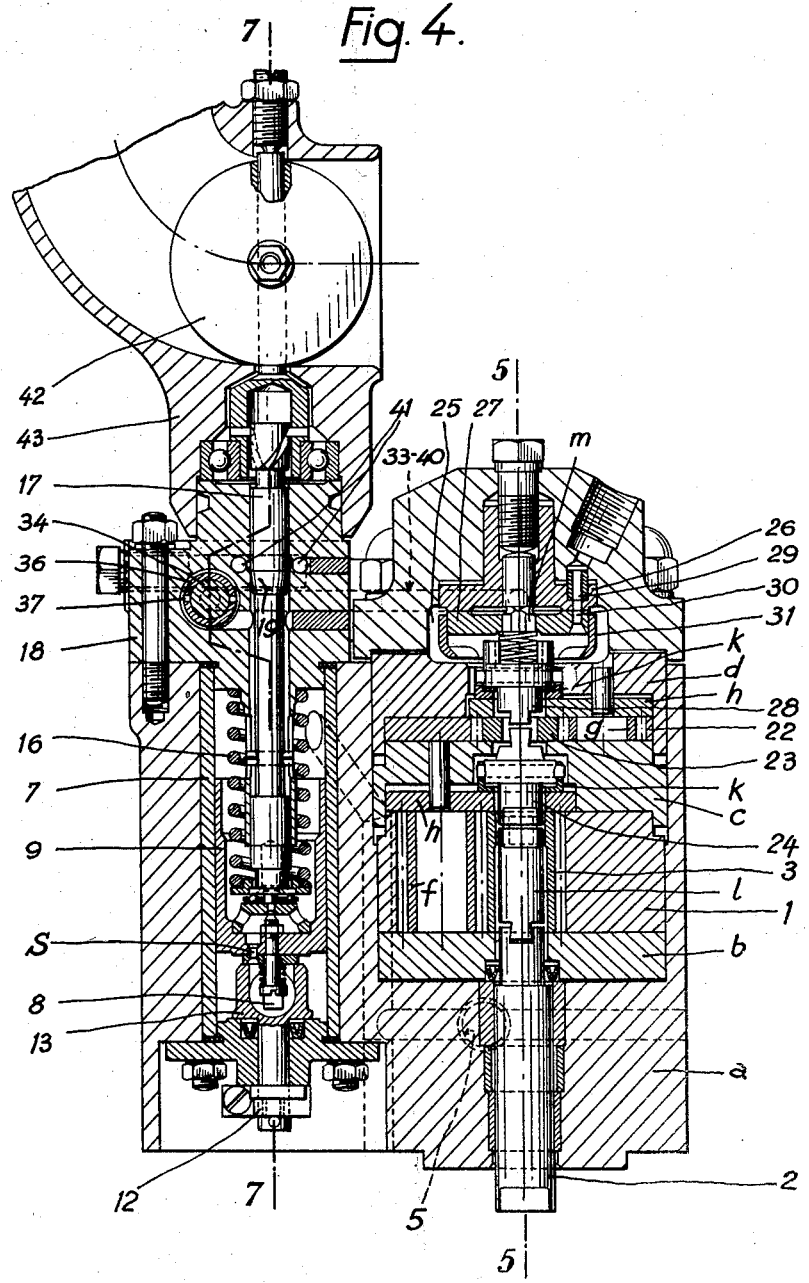

Jan. 20, 1959 J. E. TUSCHER 2,869,528
FUEL FEED DEVICE FOR INTERNAL COMBUSTION ENGINES
Filed April 1, 1955 6 Sheets-Sheet 4
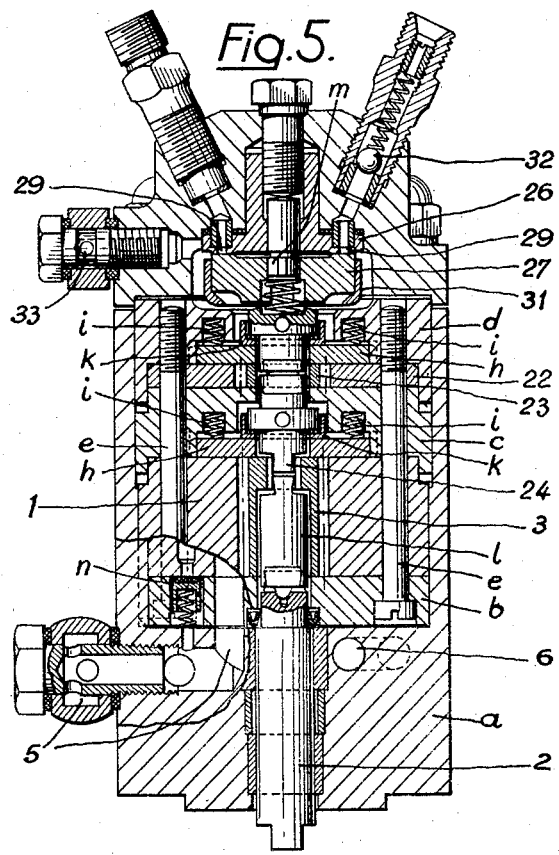
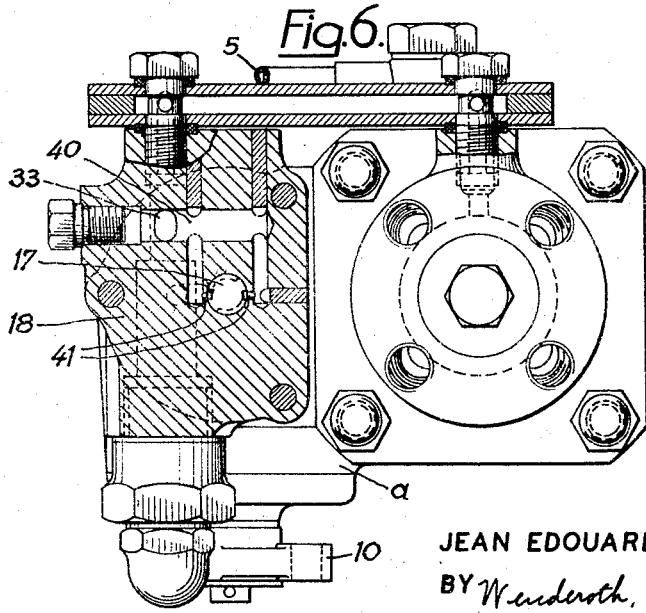
INVENTOR
JEAN EDOUARD TUSCHER
BY Wenderoth, Lind & Ponack
Attys.

INVENTOR
JEAN EDOUARD TUSCHER
BY
Wenderoth, Lind & Ponack
Attys.

United States Patent Office 2,869,528
Patented Jan. 20, 1959

2,869,528

FUEL FEED DEVICE FOR INTERNAL COMBUSTION ENGINES

Jean Edouard Tuscher, Valence, France, assignor to Sebem S. A., Neuchatel, Switzerland, a corporation of Switzerland Application April 1, 1955, Serial No. 498,691

Claims priority, application Switzerland April 28, 1954

13 Claims. (Cl. 123—140)

The present invention relates to a fuel feed device for internal combustion engines.

The device according to the invention, i. e., a fuel feed device of the type comprising at least one fuel pump stage driven by the engine, is characterized by the fact that it comprises two discharge circuits branching off at a point situated downstream from the pump, the first being circuit controlled by a piston subjected, on the one hand to the delivery pressure of the pump and, on the other hand, to the counter action of a spring, in order to ensure the measuring of at least the full-load delivery, and the second circuit being controlled by the rod of a governor, in order to reduce the said full-load delivery proportionately to the variations of the load on the engine.

The accompanying drawing illustrates, by way of example, an embodiment of the device constituting the object of the invention, and also shows a schematic view and several explanatory diagrams.

Fig. 4 is a vertical cross-section of an embodiment of the device.

Fig. 5 is a cross-section along the line 5—5 in Fig. 4.

Fig. 6 is a view from above showing the distributor and the two measuring and cut-off circuits arranged in the low-pressure part of the governor, the view being partly in section along a horizontal plane.

Figure 1:
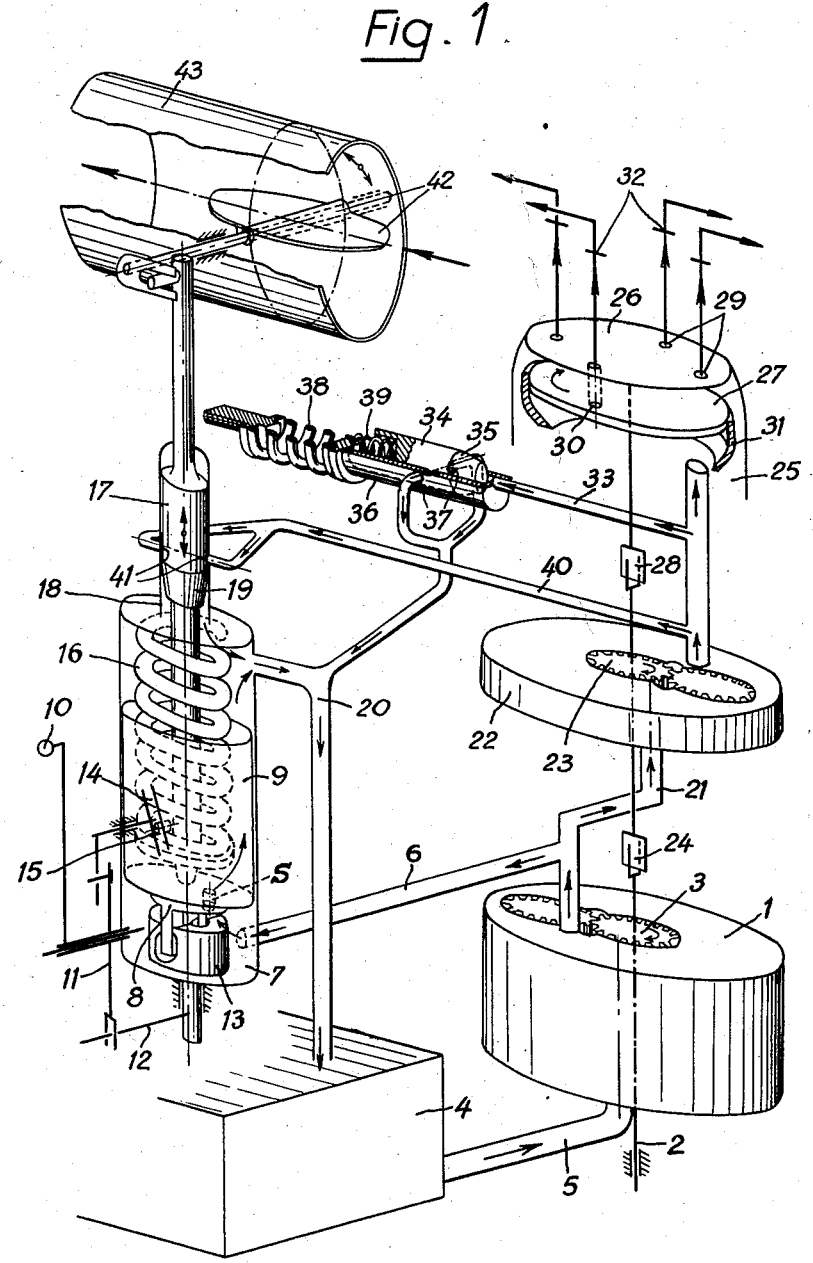
Fig. 1 is a schematic view showing the operation of the feed device.

In the schematic view shown in Fig. 1 a gear pump 1 is driven by the engine to which fuel is to be fed and controlled, by means of a shaft 2 connected to a driving pinion 3. Gear pump 1 draws the fuel from a tank 4 through a pipe 5. The fuel is delivered through a duct 6 to the cylinder 7 of the governor, the design and operation of which will be described elsewhere.

An opening S is provided in the piston 9, the opening of which is controlled by movable valve member 8, which simultaneously controls the operating conditions of the engine as a function of the load and the speed characteristic of the governing action to suit the various load conditions of the engine.

An accelerator 10 determines the amount of opening of opening S by means of the beam 11 and a lever 12 connected to a driving member 13 actuating the movable valve member 8, thus controlling the operating conditions as a function of the load torque, on the one hand, and, on the other hand, determines, by means of the same beam 11, the angular position of a slide 14 which engages a speed characteristic pin 15 which causes the piston 9 to rotate in one direction or the other during its stroke, thus increasing or diminishing the said amount of opening of opening S.

The increase of the opening S during the stroke of the piston causes the speed difference between two governing positions to increase, thus causing a greater difference in the speed characteristic than that caused by a return spring 16 bearing on piston 9, the reverse being caused when the opening S decreases.

A rod 17 of the governor slides in a bore in a cover 18, and comprises a conical portion 19 forming, together with the bore, a discharge valve for the injection circuit for admitting fuel to the interior of the cylinder 7.

The circuit for the governor leads back to the fuel tank 4 through the duct 20 which leads from the bore in cover 18.

At the outlet of the pump 1, a short duct 21 connected to the duct 6 feeds a second gear pump 22 of smaller capacity with fuel under pressure. Thus in relation to gear pump 1, gear pump 22 is a high pressure pump. Its driving pinion 23 is driven by a universal joint 24 driven from the pinion 3 of the pump 1.

The discharge of the pump 22 is led to a pressure chamber 25 comprising a distributor, which when the fuel is to be fed to a piston engine, a comprises a fixed circular plate 26 and a rotary plate 27 driven through a universal joint 28 from the pinion 23.

The fixed plate 26 is provided with equally spaced holes 29 the number of which is equal to the number of the cylinders of the engine. The holes 29 are successively placed in communication with the pressure chamber 25 through a port 30 in the rotating plate 27. Plate 27 comprises a centrifugal deflector 31 which causes a slight increase in pressure and facilitates the flow towards the port 30 which is bored at the periphery of the plate 27.

The distributing head which houses the plate 26 is fitted at each outlet 29 to the injectors (which are not shown), with a check-valve 32 preventing the return of gases from the engine towards the distributor.

When the device is to be used to feed fuel to engines with continuous combustion, such as jet engines, the rotary plate 27 is omitted and a single duct fitted with a check valve 32 leads away from the plate 26 to feed the injectors of all the combustion chambers.

A first branch 33 from the feed to the pressure chamber 25 leads to a measuring unit controlling the full-load delivery for the various conditions of operation at which the engine is utilised.

Fuel under pressure actuates a piston 34 having at the pressure receiving end a conical portion 35. The piston 34 slides in a sleeve 36 provided with two diametrically opposed ports 37 for the discharge of the injection circuit towards the tank 4. A starter spring 38, the thrust of which is adjustable, balances the thrust of the piston 34, thus determining the amount of opening of the discharge ports 37 and thereby the pressure in the injection circuit.

When the engine stops, the pressure in the chamber 25 drops and a spring 39 lodged in a hollow of the piston 34 thrusts the piston 34 so that it closes the discharge ports with plenty of overlap, thus enabling an increased injection to be provided when the engine is started.

A second branch 40 from the feed to pressure chamber leads to a cut-off circuit comprising two diametrically opposed ports 41 in the cover 18 of cylinder 7.

This cut-off circuit, which is controlled by the governor, leads through the upper portion of the cylinder 7 and the duct 20 to the tank 4.

When the fuel is to be fed to a gasoline engine, and in that case the correct air/fuel ratio is to be instantly maintained for all the conditions of operation utilised, the rod 17 of the governor is extended in the upward direction in order to control the angular position, and consequently the degree of opening, of an air throttle plate 42 in the air inlet duct 43 of the engine.

In the case of a diesel engine, the control of the air throttle by the governor is omitted.

The device operates in the following manner: at the start of the engine, the piston 34 completely closes the discharge ports 37 of the full load delivery measuring unit while the rod 17 of the governor also closes the ports 41 of the cut-off circuit 40.

Due to the simultaneous rotation of the two pumps the low pressure pump 1 and the high pressure pump 22, the pressure rises instantaneously in the cylinder of the measuring unit 36 and compresses the starter spring 38 up to a value which is equivalent to the load on the valves 32 of the distributor. The injection pump 22 having an excess delivery, and no leak being present in either of the two discharge circuits, a succession of massive injections facilitates the starting of the engine.

For a given position of the accelerator 10, the engine will run at idling speed when the piston 9 occupies a position of equilibrium in which the discharge 41 of the cut-off circuit is slightly open in order that a pressure may be maintained in the chamber 25 which is only slightly higher than the pressure at which the valves 32 open, in the case of open injectors, or than the pressure at which the injector needles lift, in the case of closed injectors. In the latter case the check valves 32 are retained in order to ensure a reliable operation, but are loaded so as to open at considerably less pressure than the injectors.

If, by moving the accelerator 10, the size of opening S in the piston 9 is increased, the pressure in the governor circuit drops, and the discharge 41 is closed down thus causing an increase of the pressure in the chamber 25 and consequently a more considerable delivery of the fuel to the fuel injectors. As the engine accelerates, the spring 39 is compressed in its housing and the piston 34 thrusts back the spring 38, thus uncovering a predetermined part of the discharge 37 of the measuring circuit.

If, when these new conditions of operation have been established, the load applied to the engine exactly corresponds to the full-delivery torque of the latter, the engine will run under the conditions of operation determined by the position of the accelerator.

If, on the other hand, the load decreases, the speed of the engine increases, as well as the rate of flow and the pressure in the governor circuit. As the size of opening has remained unchanged, the piston 9 will move upwards and the rod 17 of the governor will open a predetermined part at the discharge ports 41 of the cut-off circuit 40. The pressure in the chamber 25 will decrease thus reducing the rate of injection to a lesser value in order to maintain the conditions of operation determined in accordance with the position of the accelerator 10.

If the load now increases and returns to its initial value, the rate of flow and the pressure in the governor decrease, the governor piston 9 returns to its first position, the discharge 41 closes again and the full-load rate of injection is established anew.

The measuring and control procedure is the same for all the positions of the accelerator 10, i. e. for all the conditions of operation at which the engine is utilised, from the idling to the upper speed limit. The speed characteristic for the condition of operation, or if it is preferred, the speed difference between full-load and no-load, is adjusted in the manner familiar to those in the art.

Figure 2:
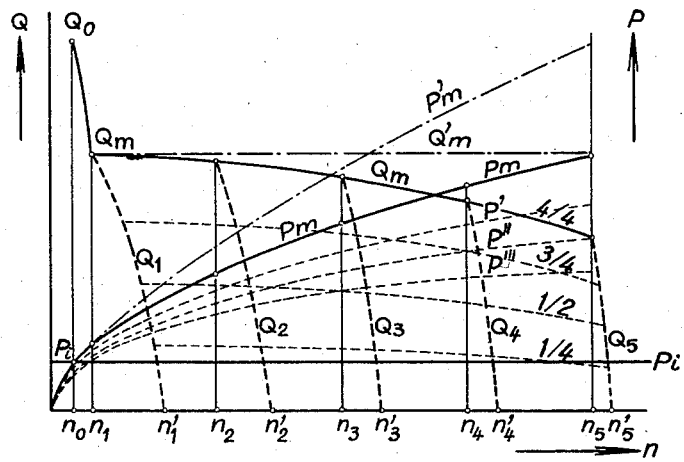
Fig. 2 is a diagram showing the aspect of the delivery curve and of the corresponding injection pressure as a function of the engine speed.

Fig. 2 shows the aspect, as a function of the speed of rotation $n$, of the maximum injection rate $Qm$ curve and of the curve of the corresponding injection pressure $pm$, for the full load of the engine. This curve for the maximum rate of delivery is controlled by the measuring circuit 33 alone.

The full-load rate of delivery $Qm$ must follow the rate of the curve indicating the charge in the cylinders of the engine, i. e., it must decrease noticeably when the speed increases. It is the curve corresponding to the most favourable rate of delivery.

By changing the characteristics of the spring 38 of the measuring unit, it is possible to modify the aspect of the rate of delivery curve at will, and for instance to obtain the constant delivery line $O'm$ corresponding to the injection pressure curve $p'm$, or even to obtain a rate of delivery which increases with the speed.

The curves $Q1, Q2, \ldots Q5$ indicate, for the corresponding speeds $n_1, n_2, \ldots n_5$, the rate of cut-off when a change in the load applied to the engine causes the circuit 6 of the governor, and consequently, the cut-off circuit 40 to function.

The speed difference $(n_1-n'_1) \ldots (n_5-n'_5)$ at the cut-off for the different conditions of operation is controlled by the governor. The flexibility of the engine depends on these speed differences.

Taking into account the value of the load at all the speeds, a set of rate of delivery curves at 4/4, 3/4, 1/2 and 1/4 load is thus obtained corresponding to the pressure curves $Pm—p'—p''$ and $p'''$.

The positions of the accelerator 10 determining the conditions of operation and the corresponding speed characteristics, it follows that the variations of the load applied to the engine enable all points of the set to be obtained so as to satisfy all the conditions of an all-speed control.

When the engine starts, as has ben seen above, the measuring piston 34 completely closes the discharge 37 of the measuring circuit 33 under the action of the starter spring 38, the opening S in the governor piston 9 being open. The discharge 41 of the cut-off circuit 40 is closed so that the injection pump 22 has no other outlet than that provided in the plate 30, and thus at the first revolution of the pump its pressure rises to the value Po which either represents the load on the valves 32, in the case of open injectors, or the load $pO$ on the needles, in the case of closed injectors. Thus, when the pressure Po is attained, the rate of delivery of the first injections achieves a value $Qo>Qm$, which will drop to $Qm$ or less as soon as one or the other or both the discharge circuits 33 and 40 come into operation.

Figure 3:
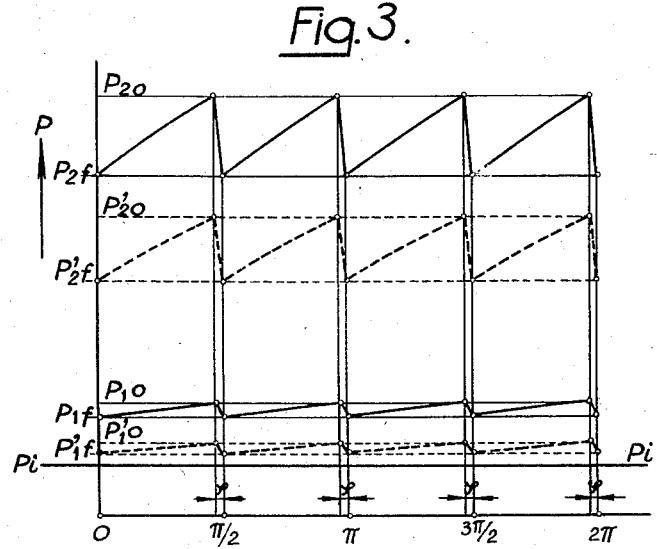
Fig. 3 is another diagram indicating the pressure variations caused by the dosing member during one revolution of a four point distributor.

Fig. 3 illustrates the rate of variation of the pressure $p$ in the chamber 25 during one revolution of the plate 26 with 4 outlets, for two different conditions of operation $n_1$ and $n_2$.

$P_1$ is the opening pressure of the check valves 32 in the case of open injectors, or the opening pressure of the needles in the case of closed injectors.

$\varphi$ is, measured in degrees, the angle of opening of the outlet at the distributor.

$P_1o$ and $P_1f$ are respectively, for a rate of delivery $Qm$, the pressures at the beginning and at the end of the injection for low speed conditions of operation $n_1$ of the engine.

$P_2o$ and $P_2f$ are the pressures at the beginning and at the end of the injection for higher speed conditions of operation $n_2$.

The pressure drops occurring during the injection are a function of the parameters of the measuring unit of the delivery circuit 33.

The pressure in the chamber 25 increases slowly from $P_1f$ to $P_1o$ over the angle $$\left(\frac{\pi}{2}-\varphi\right)$$

and then drops rapidly from $P_1o$ to $P_1f$ over the angle $\varphi$ of opening of the injection.

The pressure is thus higher when the injection opens than when it closes, and this facilitates the satisfactory operation of the injectors.

When, under one or the other of the conditions of operation $n$, a decrease in the load intervenes, the discharge 41 of the cut-off circuit 40 causes the pressure in the injection circuit 25 to drop, thus causing a decrease in the rate of delivery, as we have seen above: Dotted curves $p'_1o$—$p'_1f$, etc.

The Figs. 4 to 8 illustrate, by way of an example, an embodiment of the fuel feed device according to the invention.

The numbers indicating the components in the schematic view shown in Fig. 1 have been carried over in these drawings, and letters indicate constructive details which have not been included in the schematic view of Fig. 1.

The cross-section Fig. 4 which contains the axis of the pumps and that of the governor, shows the whole of the apparatus, the components of which are contained in a casing $a$. The pumps 1 and 22 with their end plates $b$ and $c$ and a cover $d$ together form a cylindrical block assembled by means of two screws $e$ (Fig. 5) and lodged in a boring in the casing $a$.

The driving pinions 3 and 23 and the driven pinions $f$ and $g$ are guided in the bores therefor in the bodies 1 and 22. The two pinions and the corresponding pump body may thus be machined and made the same length simultaneously.

The tightness of the lateral joints of the pumps is ensured by a plate $h$ held against the faces of the body and the two pinions by springs $i$ and by the pressure of the fuel delivered by the pump itself. Any seizing of the parts caused by differences in the elongation of the pinions and bodies is thus avoided, and the pump remains tight in spite of the slow wear of the pinions and of the bores in the pump body.

The tightness of the joints between the two stages of the pump is ensured by members $k$ rotating in contact with the plates $h$ and driven by the universal joint components L, 24 and 28 respectively driving the two pinions 3 and 23 and the rotating plate 27 mounted on a trunnion $m$ of the fixed plate 26.

Each pinion as well as the rotating distributor thus has its own shaft line, thus avoiding any disalignment producing leaks and dangerous mechanical pressures which would cause the parts to seize. These components can thus operate with kerosene, diesel fuel or even with gasoline without requiring special lubrication.

The respective numbers of the teeth of the two pinions of the injection pump 22 differ by one. One of them therefore has a lag of one tooth per revolution. In this manner, a defect in consistency of the angular delivery rate of the pump 22 does not cause a more abundant injection always to be delivered to the same cylinder, but causes the fuel to be distributed to all the cylinders at a rate which is rigorously the same over a given period.

In the cross-section shown in Fig. 5, the initial parts of the measuring circuit 33 and of the cut-off circuit 40 are united to form a single common duct leading from the chamber 25 to the cover 18 of the governor; the circuit of the pump 1 is also indicated there: inlet 5 and outlet 6 are shown towards the bottom of the governor. There may also be seen the relief valve $n$ which limits the pressure in the circuit 6 of the governor when the accelerator suddenly closes the opening S.

A horizontal cross-section through the cover 18 of the governor, Fig. 6, shows the two circuits 33 and 40 of the measuring and cut-off units.

Figure 7:
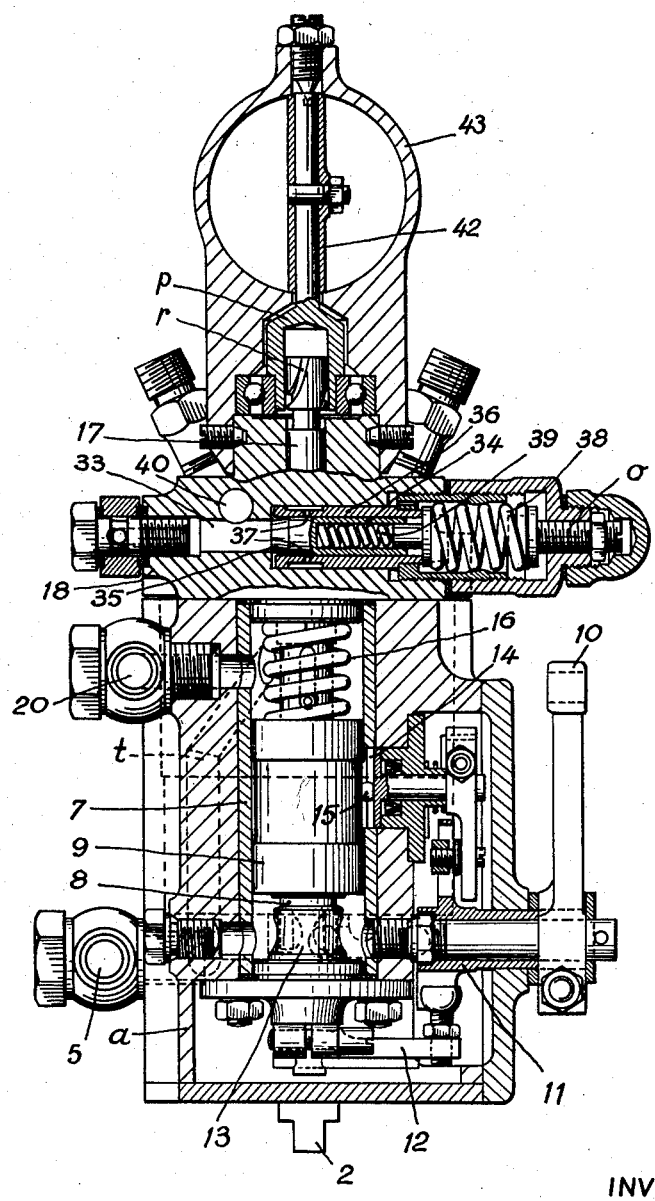
Fig. 7 is cross-section along the section line 7—7 in Fig. 4.

Fig. 7 is a cross-section containing the axis of the governor and that of the measuring unit mounted in the cover 18.

By increasing the initial thrust of the spring 38 by tightening the stop $o$, the delivery rates of the full-load injection are caused to increase due to the displacement in the upward direction of the delivery rate curve Q$m$, and vice versa. On the other hand, by giving the spring 38 a greater stiffness, the rate of delivery Q as a function of the speed $n$ is caused to increase, and vice versa.

The stroke of the piston 34 at each injection is only a few tenths of a mm.; the larger the diameter of the piston 34 the smaller its stroke. As to the surplus delivery $Q_o$ obtaining when the engine starts, it is proportional to the thrust and to the free stroke of the starter spring 39.

Fig. 7 also shows a control mechanism for the plate 42 in the inlet duct 43 of a gasoline engine. Here the pivot $p$ of the plate is actuated by two helicoidal grooves $r$ cut in the extremity of the governor rod 17.

In order to avoid the use of a gas separator, which would otherwise be necessary owing to the formation of gasoline vapors at the discharges of the three governor, measuring and cut-off circuits 6, 33 and 40, the fuel from these three circuits returns to the tank 4 through the duct 20 which leads from the top of the governor cylinder 7.

In the case of diesel pumps, the air valve is omitted and the return fuel from the three circuits can be led directly back to the inlet 5 of the pump 1, without separating gas from the kerosene or diesel fuel, through the drilled holes $t$.

Figure 8:
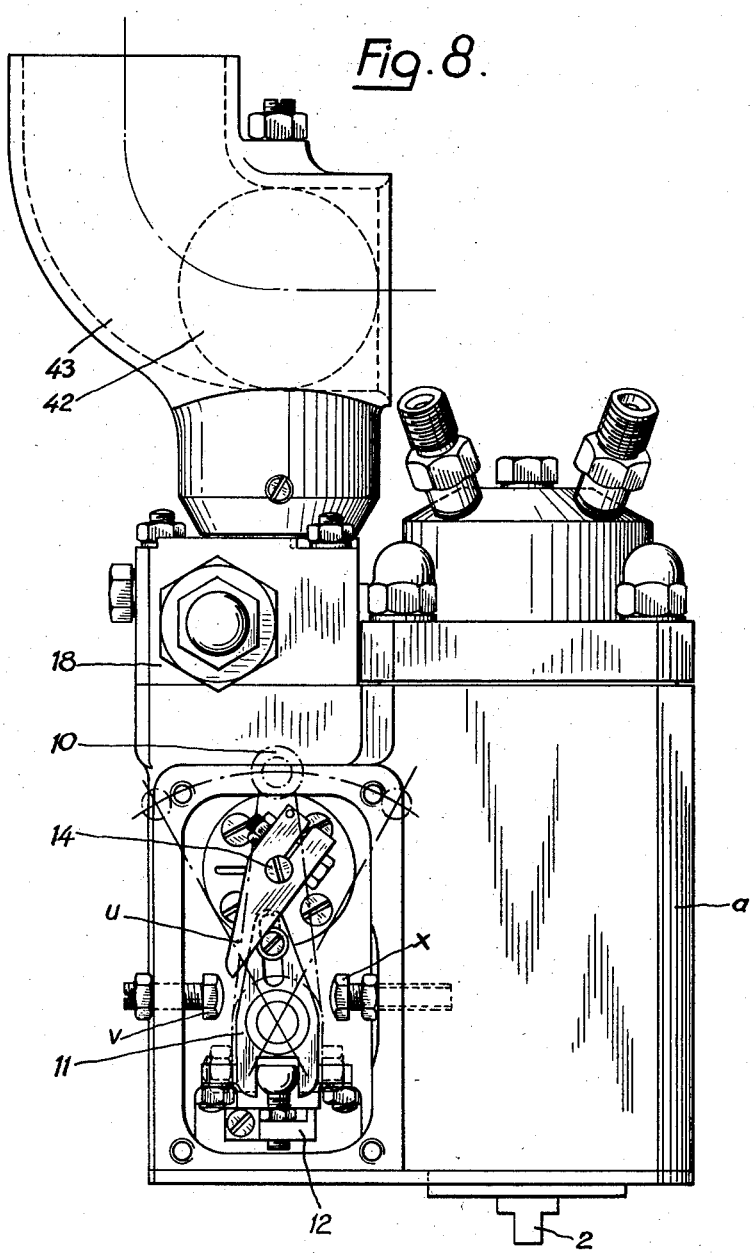
Fig. 8 is an elevation view, the cover of the accelerator being removed to show the controls of the governor.

Fig. 8 shows an elevation of the device, the cover of the accelerator 10 being removed to show the beam 11, the speed characteristic lever $u$ and the limit speed and engine stopping stops $v$ and $x$.

When the feed device according to the invention is used for the control of delivery of the fuel in continuous combustion engines such as gas turbines or reaction engines, the distributor 26, 27 can be eliminated. A single conduit provided with a check valve can be led from the pressure chamber 25 toward a conventional device for the shunt feeding of all the nozzles of the combustion chamber of the turbine or the reaction engine.

What I claim is:

1. A fuel feed device for an internal combustion engine having an air intake, said device comprising a first positive displacement pump for pumping fuel and driven by the engine, a second pressure positive displacement pump connected to said first pump and driven by said first pump and to which fuel is pumped by said first pump, a pressure chamber connected to said second pump into which fuel is pumped by said second pump, means associated with said pressure chamber for distributing fuel to the points in the engine where it is burned, a governor having a cylinder with a discharge opening therein discharging to a collecting point, a spring loaded piston in said cylinder having an opening therein adjustable from outside of said device, said opening connecting the parts of said cylinder on either side of said piston, a piston rod attached to said piston, said cylinder having a constriction therein on one side of said piston and said piston rod having a piston valve thereon slidable in said constriction for admitting fuel from said constriction into said cylinder, said cylinder discharge opening being between said piston and said constriction, said first pump also connected to said cylinder on the other side of said piston for pumping fuel to said cylinder, a first control circuit leading from said pressure chamber and comprising a control cylinder having a discharge port therein discharging to the collecting point and a spring loaded control piston therein for covering and uncovering said port under the influence of pressure of fuel from said chamber, and a second control circuit leading from said pressure chamber and opening into said constriction, said piston valve on said piston rod covering and uncovering the opening of the second control circuit into said constriction under the influence of the pressure of fuel from said first pump.

2. A device as claimed in claim 1 and a valve plate pivotally mounted in the air intake of the engine and attached to the piston rod, whereby the section of the opening of the air intake is varied to maintain the desired air-fuel ratio at all times during the operation of the engine.

3. A device as claimed in claim 1 in which said first positive displacement pump is a gear pump, and in which said second positive displacement pump is a gear pump.

4. A device as claimed in claim 1 in which said means associated with said pressure chamber comprise conduit means having a check valve therein for feeding at least one combustion chamber in which combustion is continuous.

5. A device as claimed in claim 1 in which said means associated with said pressure chamber for distributing fuel to the points in the engine where it is burned comprise a distributor having a rotary member rotatably mounted in said pressure chamber and having a centrifugal deflector depending from the edges thereof, said rotary member having an opening therein, said pressure chamber having a plurality of spaced openings therein for successive alignment with the openin in said rotary member, and conduits leading from said plurality of spaced openings.

6. A device as claimed in claim 5 further comprising universal joints between the two gear pumps and said rotary member of the distributor, whereby the axes of rotation of each of the two gear pumps and said rotary member are independent of one another for all motions other than rotary motion.

7. A device as claimed in claim 5 and sealing joints driven by said universal joints and spring loaded plates against the faces of the gear pumps rotated by said universal joints for insuring the tightness of the joints between the pumps.

8. A device as claimed in claim 5 in which the second gear pump has a driving pinion and a driven pinion, the number of teeth on the driving pinion and the driven pinion differing by one, such that on each revolution of said gear pump one of the pinions lag a distance equal to the dimension of one tooth with respect to the other pinion.

9. A device as claimed in claim 5 and adjustably loaded valves mounted in the conduits from said pressure chamber to the points in the engine where the fuel is burned.

10. A device as claimed in claim 5 in which the spring loading of said control piston in said control cylinder is such that said control piston moves each time the distributor opens said pressure chamber into communication with said conduits, whereby the injection pressure is higher when the distributor opens the conduits than when they are closed.

11. A device as claimed in claim 5 and a spring bearing on said control piston in said control cylinder to fully close the discharge port in said control cylinder when there is no pressure in said pressure chamber.

12. A fuel feed device for an internal combustion engine having an air intake and a governor with a cylinder having a discharge opening therein discharging to a collecting point and having a constriction therein, a spring loaded piston in said cylinder having an opening therein connecting the parts of the cylinder on opposite sides of the piston and adjustable from the outside of said device, and a piston rod attached to said piston with a piston valve thereon slidable in said constriction, the discharge opening being on the same side of said piston as the piston valve, said device comprising a first positive displacement pump for pumping fuel and driven by the engine and having a branch for pumping fuel to said governor cylinder on the side of said piston opposite said piston rod, a second positive displacement pump connected to said first pump and driven by said first pump and to which fuel is pumped by said first pump, a pressure chamber into which fuel is pumped by said second pump, means associated with said pressure chamber for distributing fuel to the points in the engine where it is burned, a first control circuit leading from said pressure chamber and comprising a control cylinder having a discharge port therein discharging to the collecting point and a spring loaded control piston therein for covering and uncovering said port under the influence of the pressure of the fuel from said chamber, and a second control circuit leading from said pressure chamber to said constriction, said piston valve on said governor piston rod covering and uncovering the opening of the second control circuit to said constriction under the influence of the pressure of fuel from said first pump.

13. A fuel feed device for an internal combustion engine having an air intake and a governor with a cylinder having a discharge opening therein discharging to a collecting point and having a constriction therein, a spring loaded piston in said cylinder having an opening therein connecting the parts of the cylinder on opposite sides of the piston and adjustable from outside of the device, a piston rod attached to said piston with a piston valve thereon slidable in said constriction, the discharge opening being on the same side of said piston as the piston valve, a first positive displacement pump for pumping fuel and driven by the engine and having a branch connected to the governor cylinder on the side of the piston opposite said piston rod for pumping fuel to the governor cylinder, a second positive displacement pump connected to the first displacement pump and driven by the first pump and to which fuel is pumped by the first pump, a pressure chamber connected to the second pump into which fuel is pumped by the second pump, and means associated with the pressure chamber for distributing fuel to the points in the engine where it is burned, that improvement comprising a first control circuit leading from said pressure chamber and comprising a control cylinder having a discharge port therein discharging to the collecting point and a spring loaded control piston therein for covering and uncovering said port under the influence of the pressure of the fuel from said chamber, and a second control circuit leading from said pressure chamber and opening into said constriction, said piston valve on said governor piston rod covering and uncovering the opening of the second control circuit into said constriction under the influence of the pressure of fuel from said first pump.

References Cited in the file of this patent

UNITED STATES PATENTS

| | | |
|---|---|---|
| 2,136,959 | Winfield | Nov. 15, 1938 |
| 2,603,535 | Ipsen et al. | July 15, 1952 |
| 2,670,725 | Cummins | Mar. 2, 1954 |